United States Patent [19]

Stokes

[11] 4,158,774

[45] Jun. 19, 1979

[54] RADIATION DETECTOR WITH IMPROVED PERFORMANCE CHARACTERISTICS

[76] Inventor: Arthur J. Stokes, Stokes La., Hudson, Ohio 44236

[21] Appl. No.: 750,117

[22] Filed: Dec. 13, 1976

Related U.S. Application Data

[63] Continuation of Ser. No. 601,223, Aug. 1, 1975, abandoned.

[51] Int. Cl.[2] .................. G01T 1/18

[52] U.S. Cl. .................. 250/374; 313/93

[58] Field of Search .................. 313/93; 250/374

[56] References Cited

U.S. PATENT DOCUMENTS

| | | | |
|---|---|---|---|
| 2,385,857 | 10/1945 | Herzog | 250/374 |
| 2,596,080 | 5/1952 | Raper et al. | 313/93 |
| 2,683,234 | 7/1954 | Lynch | 250/374 |
| 3,030,538 | 4/1962 | Warmoltz | 313/93 |
| 3,649,834 | 3/1972 | Randolph | 313/93 |

*Primary Examiner*—Harold A. Dixon

*Attorney, Agent, or Firm*—Fay & Sharpe

[57] ABSTRACT

A radiation detector of the gas-filled counter tube type which has a reduced count rate drift. An electrically conductive coating is applied to the interior insulating surfaces in proximity to the anode wire of a gas-filled counter tube structure having an axially disposed wire anode. The electrically conductive coating is maintained at the same electrical potential as the anode and accumulated charges in proximity to the anode are thereby eliminated. Alternately, the electrically conductive coating applied to the interior insulating surfaces in proximity to the anode may be maintained at the same electrical potential as the outer conducting cylinder in order to eliminate accumulated charges. The elimination of accumulated charges in proximity to the anode significantly reduces count rate drift and hence improves detector performance.

2 Claims, 1 Drawing Figure

RADIATION DETECTOR WITH IMPROVED PERFORMANCE CHARACTERISTICS

This is a continuation of application Ser. No. 601,223, filed Aug. 1, 1975, now abandoned.

BACKGROUND OF THE INVENTION

1. Field of the Invention

This invention is concerned with radiation detection means of the gas-filled counter tube type. Specifically, the invention relates to a means for reducing or eliminating count rate drift of radiation detection means caused by the accumulation of electrical charge on insulating surfaces contained therein. More particularly, the invention is concerned with the application of an electrically conductive coating to the interior insulating surfaces of said radiation detection means to reduce or eliminate accumulated charge thereon and thereby reduce count rate drift.

2. Description of the Prior Art

Radiation detectors of the gas-filled counter tube type are well-known and include ionization chambers, proportional counters, and Geiger-Mueller counters as typically shown in Boyd et al U.S. Pat. No. 3,043,954 and Goodings et al U.S. Pat. No. 3,702,409.

Generally speaking, gas-filled counter tube type radiation detectors consist of a conducting cylinder and an axially mounted wire anode between which a potential difference is maintained.

Ionization within the conducting cylinder occurs when a particle or ray of sufficient energy strikes an atom of gas in the conducting cylinder and causes the atom to eject an electron. As a result, the atom acquires a positive charge since it has lost an electron. In the presence of a potential difference, recombination will be largely prevented by the respective drift of positive and negative ions towards the electrodes carrying opposite polarity. This, in effect, changes the charge on the electrode system and the change in potential so produced provides an electrical indication of the ionizing event.

A problem encountered in the use of these types of radiation counter tubes is a drift in the count rate of the tube with time. This drift can occur even when the tube is exposed to a constant flux and may result in an output change of as much as several percent of the total number of counts. The cause of the drift in count rate is an accumulation of electrical charge on insulating surfaces within the conducting cylinder. There is, therefore, a need for a radiation detector of the gas-filled counter tube type which avoids accumulation of electrical charge on the insulating surfaces therein and can hence reduce or eliminate count rate drift. The present invention represents an improvement over the prior art in that it allows accurate and reliable count rate measurements to be made with gas-filled counter tubes.

SUMMARY OF THE INVENTION

This invention relates to improved radiation detection gas filled counter tubes and a means for reducing or eliminating count rate drift caused by the accumulation of electrical charges upon the insulating surfaces in the interior of gas-filled counter tubes by applying an electrically conductive coating to the insulating surfaces therein.

An electrically conducting coating such as colloidal graphite is applied to the surface of the insulating anode supports. The conductive coating is applied so that it maintains contact with the anode while maintaining electrical isolation from the conducting cylinder. Alternately, the electrically conductive coating may be in electrical communication with the outer conducting cylinder and electrically isolated from the anode. By thus stabilizing the potential about the anode insulator supports, the count rate drift in the counter is significantly reduced or eliminated.

One object of the present invention is to permit stable and reliable radiation measurements using gas-filled counter tubes.

A further object of the present invention is to eliminate count rate drift in gas-filled counter tubes.

A still further object of the present invention is the utilization of an electrically conductive coating on interior insulating surfaces of gas-filled counter tubes to reduce the accumulation of electrical charge thereon.

DESCRIPTION OF THE PREFERRED EMBODIMENT

Figure 1:
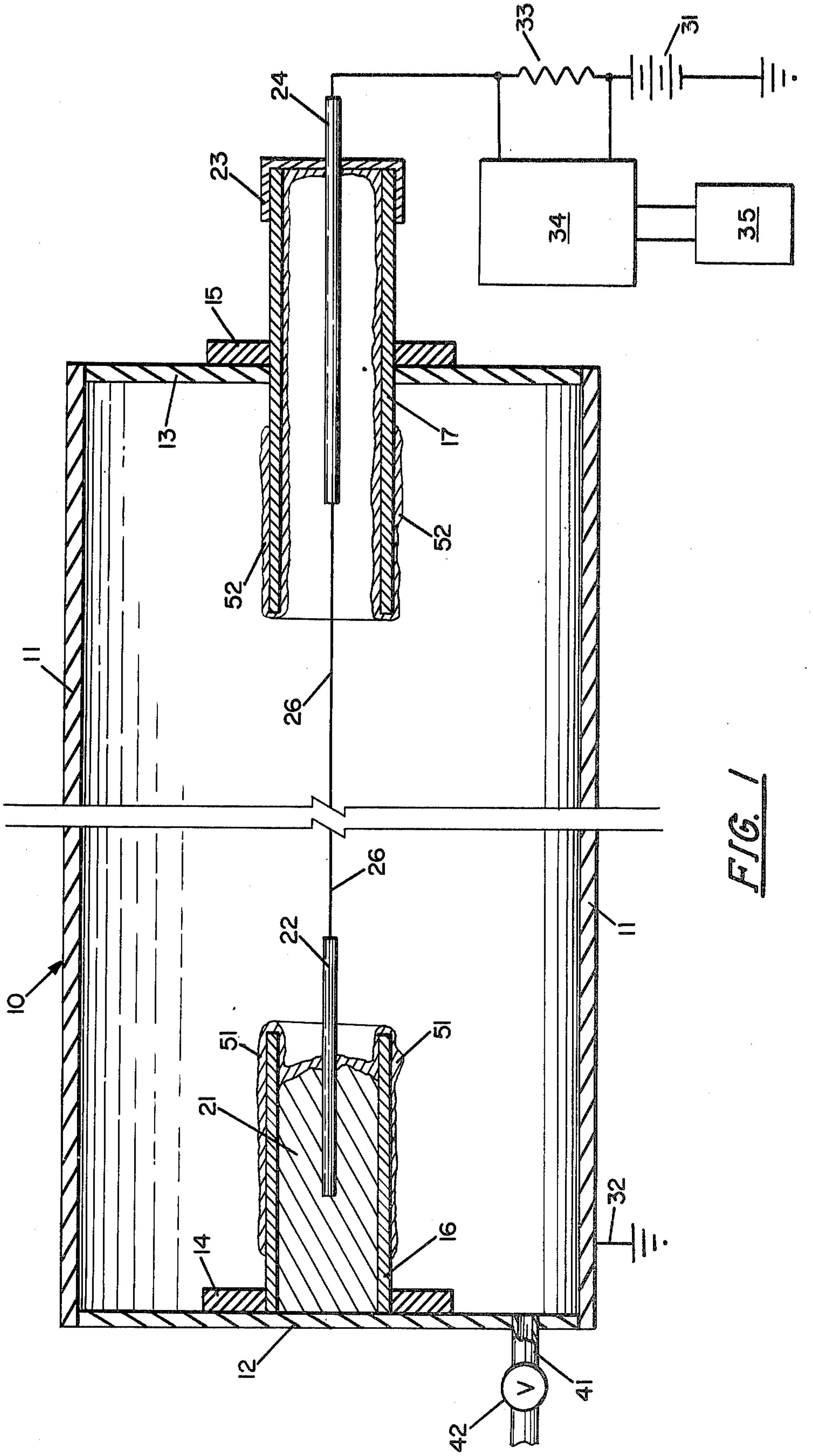
FIG. 1 is a front view in axial section of a counter tube with its associated electrical circuitry shown schematically.

Referring to FIG. 1, there is shown a radiation detector of the gas-filled counter tube type 10. The counter tube 10 is comprised of an outer conducting cylinder 11 and end plates 12 and 13 which may be fixedly attached to the ends of the conducting cylinder 11 and then sealed by welding or brazing to provide a hermetically sealed enclosure.

Flanges 14 and 15 are fixedly attached to end plates 12 and 13 respectively. The flange 14 retains cylindrically shaped anode insulating support 16 in its centrally disposed position within the conducting cylinder 11. Likewise, flange 15 retains cylindrically shaped anode insulating support 17 in its centrally disposed position within the conducting cylinder 11 and, in addition, maintains a sealing relationship between the insulating support 17 and the end plate 13.

Located within and affixed to insulating support 16 by binder material 21 is conducting rod 22 which is axially disposed relative to the conducting cylinder 11. It should be noted that the conducting rod 22 is maintained in electrical isolation from the conducting cylinder 11 for reasons discussed in more detail below.

In a somewhat similar manner, the conducting rod 24 is retained in an axially disposed position by end cap 23 which fixedly attaches the conducting rod 24 to the insulating support 17. In addition, the end cap 23 provides a sealing relationship between the conducting rod 24 and the insulating support 17. For reasons which will be later appreciated, it should be observed that the conducting rod 24 is electrically isolated from the conducting cylinder 11.

Fixedly attached to and axially disposed between the ends of conducting rods 22 and 24 is centrally located metallic anode 26. The anode 26 electrically communicates via conducting rod 24 with a suitable source of energizing potential 31 by way of a series connected resistor 33. A suitable amplitude discriminating and amplifying device 34 is connected across the resistor 33 in the conventional manner. The device 34 allows the detection of pulses created by the occurrence of ionizing events within the conducting cylinder 11. The output of the amplitude discriminating and amplifying device 34 is provided as the input of a recorder 35 as is also the convention. The conducting cylinder 11 is returned to ground potential by way of a suitable connecting wire 32.

As is conventional in counter tubes of this type, a valve controlled pipe 41 is mounted in and projects through plate 12 for communication with the interior of the conducting cylinder 11. Control valve 42 is a standard pressure type valve commercially available for this purpose. By use of pipe 41 and control valve 42, the interior of the cylinder 11 may be evacuated and the desired detector gas at the prescribed pressure may be supplied thereto.

A typical application for the counter tube described above would be for the detection of a neutron flux. Since neutrons have no associated charge, they cannot be detected directly, and resort must be made to a measurement of a reaction which they produce. The most convenient method employs a proportional counter of the type described above filled with boron trifluoride gas, $BF_3$, enriched in the proportion of the boron 10 isotope which has a high capture cross section for thermal neutrons. The probability that an impinging neutron will be accepted into the nucleus of the $B^{10}$ atom is relatively high. Such capture initiates a nuclear transformation evidenced by the emission of an alpha particle and the transmutation of boron-10 to lithium-7. The alpha particle and the recoil lithium-7 ion produce collision electrons along their path through the gas of the counter. The resulting ionization is proportional to the number of neutrons captured and is employed to give an indication of the neutron flux density.

Conventionally, the conducting cylinder of the counting tube is maintained at a high negative potential relative to the centrally disposed anode, producing an electrostatic field in the gas volume to accelerate free electrons toward the anode.

The original collision electrons produce, by collisions with gas molecules in the region near the central anode, additional free electrons which are in turn accelerated and by collision produce more free electrons. The sequence continues until the charge migration reaches and is collected by the positive anode. This charge multiplication results in an output pulse of sufficient magnitude to energize the amplifying and discriminating device 34 connected to the anode.

The sum of path lengths of the alpha particle and the lithium-7 ion is only a few millimeters, much less than the diameter of the conducting cylinder. However, the original collision electrons must reach the region of very high potential within about 1/10 millimeter of the anode before they acquire sufficient energy per mean free path to sustain the charge multiplication. Therefore, electrons produced along a path which is in a region of low potential may be lost by attachment and recombination before they can contribute to an output pulse. The probability of free electrons reaching the required energy to initiate a charge multiplication may be termed "survival probability" and is a function of the potential in the region of a given path. If the radial electrostatic field distribution were uniform throughout the counter, neutrons captured at the same distance from the anode at any point along the length of the anode would be equally efficient in producing an output pulse.

In prior art radiation detectors, however, there is an appreciable portion of the sensitive volume near the ends of the anode where the electrostatic field is reduced due to the presence of anode supports which do not support a potential gradient across their surfaces similar to that across the internal volume of the conducting cylinder 11. The potential gradient of these surfaces is affected by the accumulation of electrical charge due to the free electrons which come to rest upon the insulating surfaces. The accumulated charge on the insulating surfaces distorts the electrostatic field created by the conducting cylinder 11 and the anode 26. The distorted electrostatic field prevents a uniform gas amplification of each counting event in the tube and thereby causes erroneous counting pulses. Since the build-up of free electrons upon the insulating surfaces takes place over a period of time, the error introduced by the electron build-up also varies and is commonly termed count rate drift.

The build-up of free electrons on the insulating surfaces may be eliminated by applying an electrically conductive coating, such as colloidal graphite, to a portion of the insulation surface which is exposed to the internal volume as shown at 51 and 52. The electrically conductive coating is then maintained at a constant potential by being in electrical communication with the anode 26 and electrically isolated from the conducting cylinder 11. All of the insulation surfaces having a conductive coating in a given counter tube should be maintained at the same potential in the preferred embodiment, although this is not absolutely necessary.

The preferred embodiment, as shown in FIG. 1, has an electrically conductive coating 51 applied to the insulating support 16 and binder material 21 such that the coating 51 contacts and is in electrical communication with conducting rod 22 and hence anode 26. It should be noted that the coating 51 is not applied in proximity to the flange 14 and is, therefore, electrically isolated from the flange 14 and the conducting cylinder 11.

Similarly, electrically conductive coating 52 is applied to insulating support 17 and end cap 23 such that the coating 52 contacts and is in electrical communication with conducting rod 24 and, therefore, anode 26. It should be observed that the coating 52 is not applied in proximity to the flange 13 and is, therefore, electrically isolated from the flange 13 and the conducting cylinder 11.

In operation, it will be observed that any free electrons which may land on the conductive coating 51 or 52 will be attracted by the positive electrical potential applied to the anode 26 and the conductive coatings 51 and 52 and will be induced by said positive electrical potential to traverse from coatings 51 and 52 to energizing potential 31, thereby eliminating any build-up of free electrons on the conductive coatings 51 and 52 and hence reducing or eliminating any count rate drift.

A gas-filled proportional counter tube as described above has been operated and found to exhibit a very large reduction in the amount of count rate drift shown by conventional counter tubes.

An alternate embodiment of the present invention consists of maintaining the electrically conductive coatings 51 and 52 at the same potential as the conducting cylinder 11 by selective application thereof. The operation of this embodiment is analogous to that described for the preferred embodiment.

The use of the electrically conductive coating to reduce count rate drift is not limited to the counter tube structure disclosed, and may be used in conjunction with other conventional counter tube structures to achieve the same result. In addition, the structure disclosed herein may be utilized, with the appropriate modifications known by one skilled in the art, as an ionization chamber having a reduced count rate drift.

The following claims are intended to cover all modifications which do not depart from the spirit and scope of the invention. The invention is not to be necessarily limited to the specific construction illustrated and described, since such construction is only intended to be illustrative of the principle of operation and the means presently devised to carry out said principle. It is to be considered that the invention comprehends any minor change in construction that may be permitted within the scope of the disclosure.

I claim:

1. A radiation detector of the gas-filled counter tube type having a sensitive volume, comprising:

a. a conducting cylinder;

b. end plates attached to said conducting cylinder sealing same;

c. anode insulating supports affixed to said end plates;

d. an anode coaxially extending through said conducting cylinder, said anode being fixedly attached to said anode insulating supports;

e. means for communicating with and for evacuating said conducting cylinder and filling same with a suitable filler gas for radiation detection;

f. circuit means operatively connecting a source of suitable direct current potential to said anode and said conducting cylinder; and g. an electrically conductive coating on said insulating supports in proximity to said sensitive volume and in electrical communication with said anode and electrically isolated from said conducting cylinder, said electrically conductive coating preventing the accumulation of electrical charge on said insulating supports in proximity to said sensitive volume;

said anode insulating supports comprising a first cylindrically shaped insulating member affixed at one end thereof to one of said end plates and a second cylindrically shaped insulating member affixed to another of said end plates and traversing therethrough;

said anode being fixedly attached to one of said anode insulating supports by means comprising an axially disposed conducting rod having fixedly attached to one end thereof said anode;

a binder material disposed within said other anode insulating support and in contact with said conducting rod so as to establish a mechanical connection therebetween.

2. The radiation detector of claim 1, wherein said electrically conductive coating is comprised of colloidal graphite.

* * * * *